March 23, 1926.

E. SLUSSER 1,577,937

ILLUMINATED SAFETY BUMPER FOR AUTOMOBILES

Original Filed Feb. 1, 1924

Inventor

Eugene Slusser

By Shepherd & Campbell

Attorneys

Patented Mar. 23, 1926.

1,577,937

UNITED STATES PATENT OFFICE.

EUGENE SLUSSER, OF SANTA ROSA, CALIFORNIA.

ILLUMINATED SAFETY BUMPER FOR AUTOMOBILES.

Application filed February 1, 1924, Serial No. 689,906. Renewed February 18, 1926.

*To all whom it may concern:*

Be it known that I, EUGENE SLUSSER, a citizen of the United States, residing at Santa Rosa, in the county of Sonoma and State of California, have invented certain new and useful Improvements in Illuminated Safety Bumpers for Automobiles, of which the following is a specification, reference being had therein to the accompanying drawings.

This invention relates to an illuminated safety bumper for automobiles and it has for its object to associate with an automobile bumper, lights, arranged to delimit the width of the vehicle by which it is carried for the benefit of the drivers of other vehicles.

It is a well known fact that many serious accidents have been caused because the driver of one vehicle, dazzled by the lights of an approaching vehicle, has been unable to judge with accuracy the position of such other vehicle and consequently collided with the same. By locating small lights, which are not of such brilliance as to dazzle, but which accurately indicate the extreme width of the vehicle, at the extremities of the bumpers, such accidents may be prevented. It is intended to use the lamps both in conjunction with front and rear bumpers, though they have their greatest utility when used with the front bumpers.

Further objects and advantages of the invention will be set forth in the detailed description which follows.

In the accompanying drawing.

Like numerals designate corresponding parts in both of the figures of the drawing.

Figure 1:
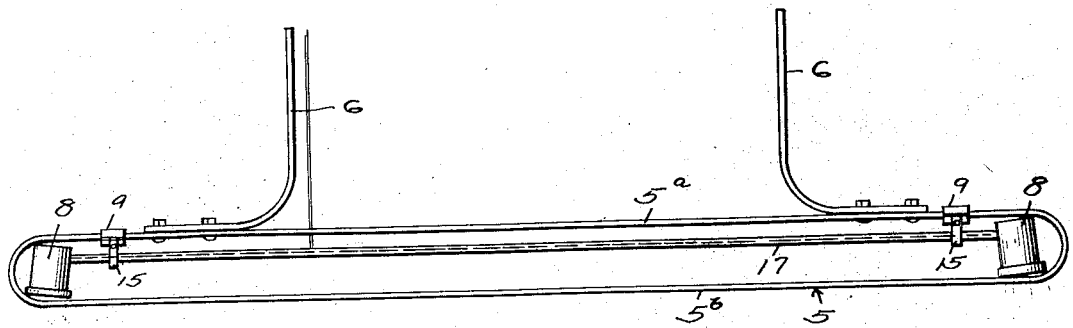
Fig. 1 is a plan view of a bumper having the invention applied thereto.
Figure 2:
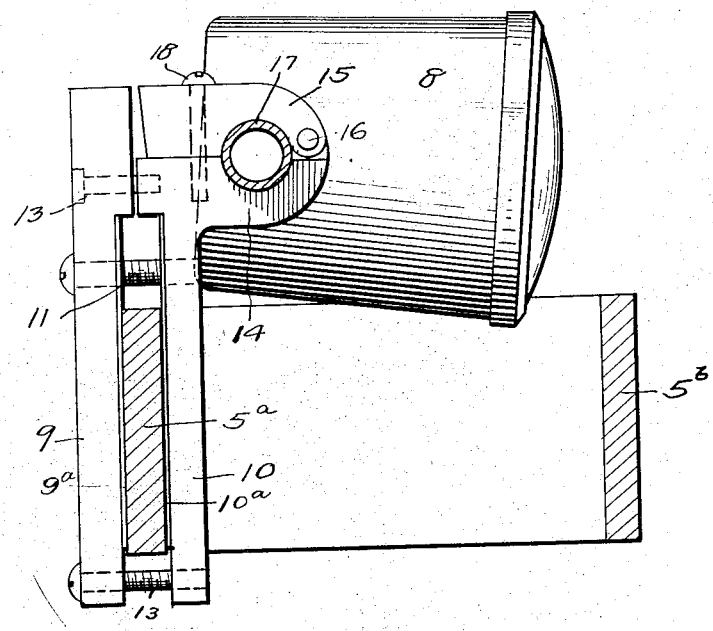
Fig. 2 is an enlarged transverse sectional view through said bumper on line 2—2 of Fig. 1.

In the drawing 5 designates a spring steel loop constituting the body portion of the bumper and 6 the rearwardly extending supporting arms by which the body portion of the bumper is secured to the automobile. Electric lamps 7 and 8 project forwardly of the inner run of the loop 5, indicated at 5ª, and terminate rearwardly of the outer run of said loop, indicated at 5ᵇ. Thus the inner run serves to support the lamps and the outer run serves to protect said lamps from coming into forcible contact with objects which would bend or break them. For securing the lamps to the rear run 5ª, I employ clamps consisting of outer portions 9 and inner portions 10, the two being drawn forcibly toward each other and into binding engagement with the run 5ª by screws 11, 12 and 13. Rubber or leather pads 9ª, 10ª may be placed between these clamp sections and the bumper, if desired.

The inner sections 10 of the clamps have inwardly projecting ears 14 formed thereon and these ears, in turn, have jaws 15 pivotally connected thereto at 16, said jaws being adapted to engage over a hollow rod 17 and to be bound in firm engagement therewith by screws 18.

The lamps are rigidly mounted upon the outer ends of the hollow rod 17 and may be secured thereto by soldering, brazing or in any other way. The hollow rod serves as a conduit for the passage of the electric wire to the lamps and it is intended that the lamps shall be connected to the headlights of the automobile so that whenever the headlights are lighted these lamps will burn. The lenses 19 of the lamps are made thick and strong to resist accidental blows.

It is to be understood that the invention is not limited to the precise structure herein shown and described because it is manifest that the position of the lamps may be varied and that other types of clamping means may be employed within the skill of the mechanic.

It is to be understood that the invention includes within its purview whatever changes fairly come within either the terms or the spirit of the appended claims.

Having described my invention what I claim is:

1. The combination with an automobile bumper comprising inner and outer runs, of two-part clamps adapted to embrace the inner run, screws for drawing the two parts of the clamp together that portion of the two-part clamp lying inwardly of the inner run having an inwardly projected ear and a pivoted jaw, means for binding said pivoted jaw to the ear, a hollow rod supported horizontally by said clamps and electric lamps carried by said hollow rod and located adjacent the ends of the bumper, the wires of said lamp passing through said horizontal rod.

2. In a device of the character described the combination with a bumper comprising front and rear runs, of clamps secured to the rear run, a horizontally disposed rod supported by said clamps and extending substantially the full length of the bumper and constituting a conduit for electric wires and forwardly directed electric lamps at the outer ends of said rod, secured directly to said rod and supported thereby.

In testimony whereof I hereunto affix my signature.

EUGENE SLUSSER.